(12) United States Patent
Frank et al.

(10) Patent No.: US 7,634,636 B2
(45) Date of Patent: Dec. 15, 2009

(54) DEVICE, SYSTEM AND METHOD OF REDUCED-POWER MEMORY ADDRESS GENERATION

(75) Inventors: Uri Frank, Beit-Itzhak (IL); Ram Kenyagin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 11/472,538

(22) Filed: Jun. 22, 2006

(65) Prior Publication Data

US 2007/0300039 A1    Dec. 27, 2007

(51) Int. Cl.
*G06F 12/06* (2006.01)
*G06F 9/34* (2006.01)
*G06F 9/35* (2006.01)
*G06F 9/355* (2006.01)

(52) U.S. Cl. ............... 711/220; 711/1; 711/2; 711/200; 711/203; 711/213

(58) Field of Classification Search ............... None
See application file for complete search history.

(56) References Cited

U.S. PATENT DOCUMENTS

| | | | |
|---|---|---|---|
| 5,696,507 A * | 12/1997 | Nam ......................... | 341/67 |
| 6,807,616 B1 * | 10/2004 | McGrath et al. ............ | 711/206 |
| 6,922,769 B2 | 7/2005 | Liron et al. | |
| 7,103,751 B1 * | 9/2006 | Toll et al. ................... | 711/220 |
| 2005/0216697 A1 | 9/2005 | Liron et al. | |

* cited by examiner

*Primary Examiner*—Jack A Lane
(74) *Attorney, Agent, or Firm*—Pearl Cohen Zedek Latzer, LLP (57) ABSTRACT

Devices, systems and methods of reduced-power memory address generation. For example, an apparatus includes: a carry save adder including at least a first set of adders and a second set of adders, wherein the adders of the first set are able to receive a first number of input bits and to produce a first number of outputs, and wherein adders of the second set are able to receive a second number of input bits and to produce the first number of outputs.

22 Claims, 4 Drawing Sheets

DEVICE, SYSTEM AND METHOD OF REDUCED-POWER MEMORY ADDRESS GENERATION

BACKGROUND OF THE INVENTION

In the field of computing, a computing system may utilize one or more references to a memory address. For example, a logical address may be referenced by an assembler language code; a linear address (LA) may be generated by an address generation unit (AGU) based on the logical address and one or more virtual address (VA) components; and a physical address (PA) may b produced by a data translation lookaside buffer (DTLB) based on the linear address.

An increase in storage capacity of memory units results in utilization of longer memory references, for example, 48-bit or 64-bit memory references. Unfortunately, a larger number of hardware components and increased power consumption may be associated with generation of longer memory references and validation of compliance of a longer memory reference with architecture-defined formats.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Although embodiments of the invention are not limited in this regard, embodiments of the invention may be used in conjunction with many apparatuses, for example, a computer, a computing platform, a personal computer, a desktop computer, a mobile computer, a laptop computer, a notebook computer, a personal digital assistant (PDA) device, a tablet computer, a server computer, a network, a wireless device, a wireless station, a wireless communication device, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and/or "a plurality" as used herein may include, for example, "multiple" or "two or more". The terms "plurality" and/or "a plurality" may be used herein describe two or more components, devices, elements, parameters, or the like. For example, a plurality of elements may include two or more elements.

Although portions of the discussion herein may relate, for demonstrative purposes, to a memory "address" which may be generated, produced, created, handled, validated, verified, checked, accessed, or the like, embodiments of the invention are not limited in this regard. For example, other memory references may be used in accordance with embodiments of the invention, e.g., a memory reference, a memory pointer, a memory alias, a "shortcut" to a memory cell or to a memory line, or the like.

Although portions of the discussion herein may relate, for demonstrative purposes, to a memory address which may be referenced using a 64-bit data item, and/or to a memory address which may be referenced using 48 bits of a 64-bit data item, embodiments of the invention are not limited in this regard. For example, other lengths or sizes of data items or portions thereof may be used to reference a memory address in accordance with embodiments of the invention.

Although portions of the discussion herein may relate, for demonstrative purposes, to reference to a "memory" address, embodiments of the invention are not limited in this regard. For example, some embodiments of the invention may be utilized in conjunction with references to portions or sites of a storage unit, a long term storage unit, a short term storage unit, a physical memory unit, a virtual memory unit, a volatile or non-volatile memory unit, or the like.

Figure 1:
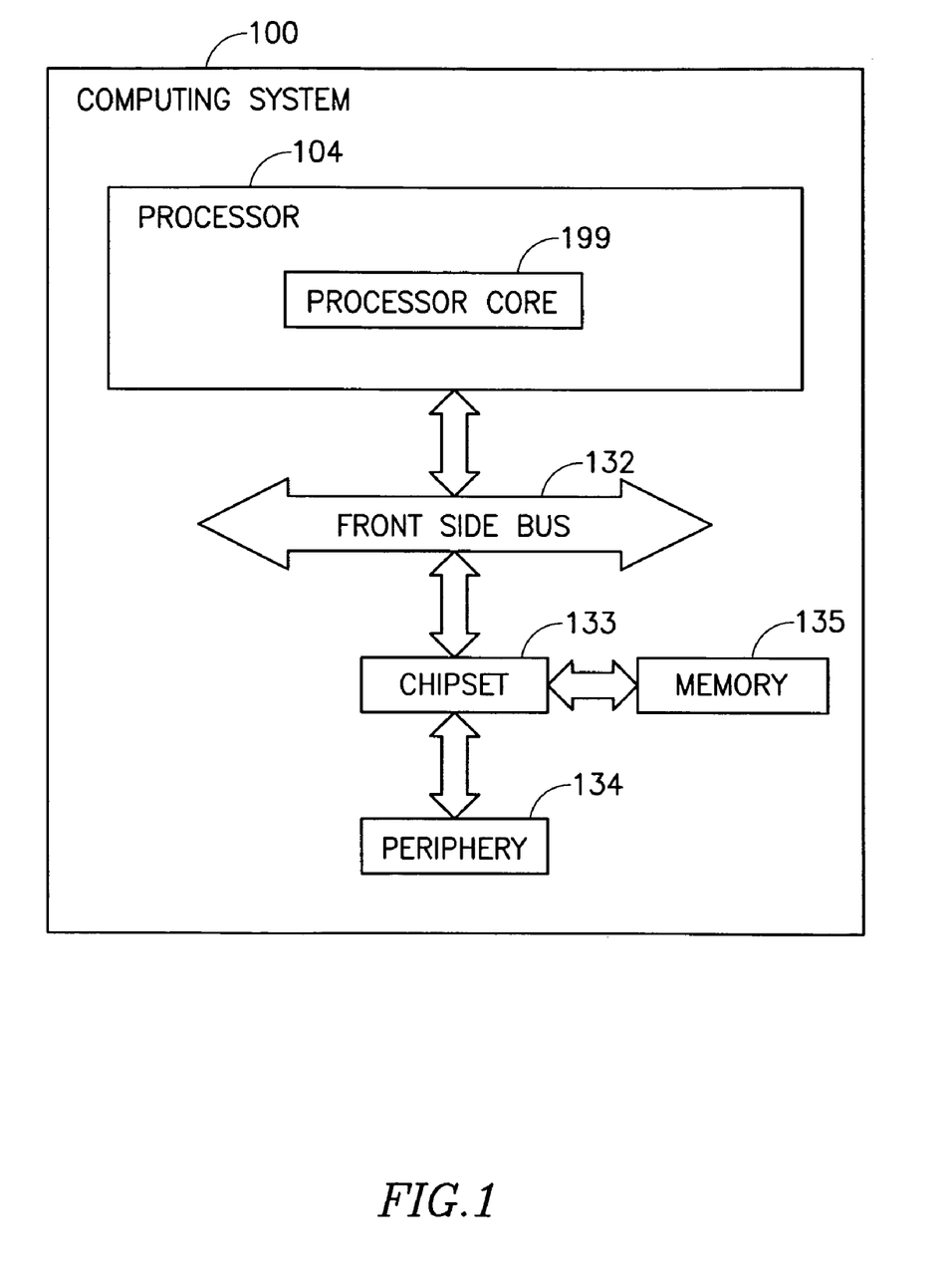
FIG. 1 is a schematic block diagram illustration of a computing system able to utilize reduced-power memory address generation in accordance with an embodiment of the invention.

FIG. 1 schematically illustrates a computing system 100 able to utilize reduced-power memory address generation in accordance with some embodiments of the invention. Computing system 100 may include or may be, for example, a computing platform, a processing platform, a personal computer, a desktop computer, a mobile computer, a laptop computer, a notebook computer, a terminal, a workstation, a server computer, a personal digital assistant (PDA) device, a tablet computer, a network device, a cellular phone, or other suitable computing device, processing device and/or communication device.

Computing system 100 may include a processor 104, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Processor 104 may include one or more processor cores, for example, a processor core 199. Processor core 199 may optionally include, for example, an in-order module or subsystem, an out-of-order module or subsystem, an execution block or subsystem, one or more execution units (EUs), one or more adders, multipliers, shifters, logic elements, combination logic elements, AND gates, OR gates, NOT gates, XOR gates, switching elements, multiplexers, sequential logic elements, flip-flops, latches, transistors, circuits, sub-circuits, and/or other suitable components.

Computing system 100 may further include a shared bus, for example, a front side bus (FSB) 132. For example, FSB 132 may be a CPU data bus able to carry information between processor 104 and one or more other components of computing system 100.

In some embodiments, for example, FSB 132 may connect between processor 104 and a chipset 133. The chipset 133 may include, for example, one or more motherboard chips, e.g., a "northbridge" and a "southbridge", and/or a firmware hub. Chipset 133 may optionally include connection points, for example, to allow connection(s) with additional buses and/or components of computing system 100.

Computing system 100 may further include one or more peripheries 134, e.g., connected to chipset 133. For example, periphery 134 may include an input unit, e.g., a keyboard, a keypad, a mouse, a touch-pad, a joystick, a stylus, a microphone, or other suitable pointing device or input device; and/or an output unit, e.g., a cathode ray tube (CRT) monitor, a liquid crystal display (LCD) monitor, a plasma monitor, other suitable monitor or display unit, a speaker, or the like; and/or a storage unit, e.g., a hard disk drive, a floppy disk drive, a compact disk (CD) drive, a CD-recordable (CD-R) drive, a digital versatile disk (DVD) drive, or other suitable removable and/or fixed storage unit. In some embodiments, for example, the aforementioned output devices may be coupled to chipset 133, e.g., in the case of a computing system 100 utilizing a firmware hub.

Computing system 100 may further include a memory 135, e.g., a system memory connected to chipset 133 via a memory bus. Memory 135 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. In some embodiments, processor core 199 may access memory 135 as described in detail herein. Computing system 100 may optionally include other suitable hardware components and/or software components.

Figure 2:
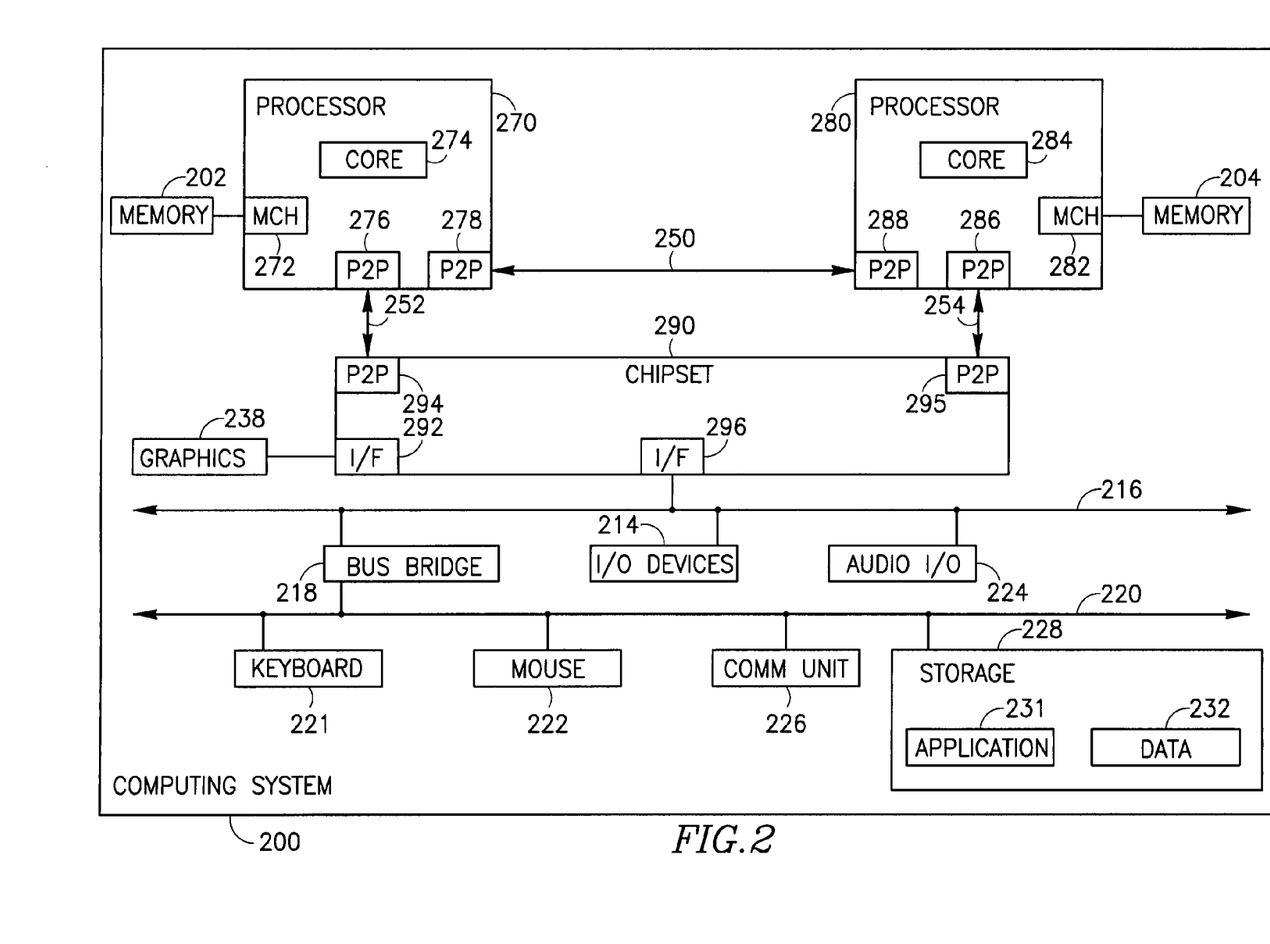
FIG. 2 is a schematic block diagram illustration of a computing system able to utilize reduced-power memory address generation in accordance with another embodiment of the invention.

FIG. 2 schematically illustrates a computing system 200 able to utilize reduced-power memory address generation in accordance with some embodiments of the invention. Computing system 200 may include or may be, for example, a computing platform, a processing platform, a personal computer, a desktop computer, a mobile computer, a laptop computer, a notebook computer, a terminal, a workstation, a server computer, a PDA device, a tablet computer, a network device, a cellular phone, or other suitable computing and/or processing and/or communication device.

Computing system 200 may include, for example, a point-to-point busing scheme having one or more processors, e.g., processors 270 and 280; memory units, e.g., memory units 202 and 204; and/or one or more input/output (I/O) devices, e.g., I/O device(s) 214, which may be interconnected by one or more point-to-point interfaces.

Processors 270 and/or 280 may include, for example, processor cores 274 and 284, respectively. In some embodiments, processor cores 274 and/or 284 may utilize data validity tracking as described in detail herein.

Processors 270 and 280 may further include local memory channel hubs (MCHs) 272 and 282, respectively, for example, to connect processors 270 and 280 with memory units 202 and 204, respectively. Processors 270 and 280 may exchange data via a point-to-point interface 250, e.g., using point-to-point interface circuits 278 and 288, respectively.

Processors 270 and 280 may exchange data with a chipset 290 via point-to-point interfaces 252 and 254, respectively, for example, using point-to-point interface circuits 276, 294, 286, and 295. Chipset 290 may exchange data with a high-performance graphics circuit 238, for example, via a high-performance graphics interface 292. Chipset 290 may further exchange data with a bus 216, for example, via a bus interface 296. One or more components may be connected to bus 216, for example, an audio I/O unit 224, and one or more input/output devices 214, e.g., graphics controllers, video controllers, networking controllers, or other suitable components.

Computing system 200 may further include a bus bridge 218, for example, to allow data exchange between bus 216 and a bus 220. For example, bus 220 may be a small computer system interface (SCSI) bus, an integrated drive electronics (IDE) bus, a universal serial bus (USB), or the like. Optionally, additional I/O devices may be connected to bus 220. For example, computing system 200 may further include, a keyboard 221, a mouse 222, a communications unit 226 (e.g., a wired modem, a wireless modem, a network card or interface, or the like), a storage device 228 (e.g., able to store a software application 231 and/or data 232), or the like.

Figure 3:
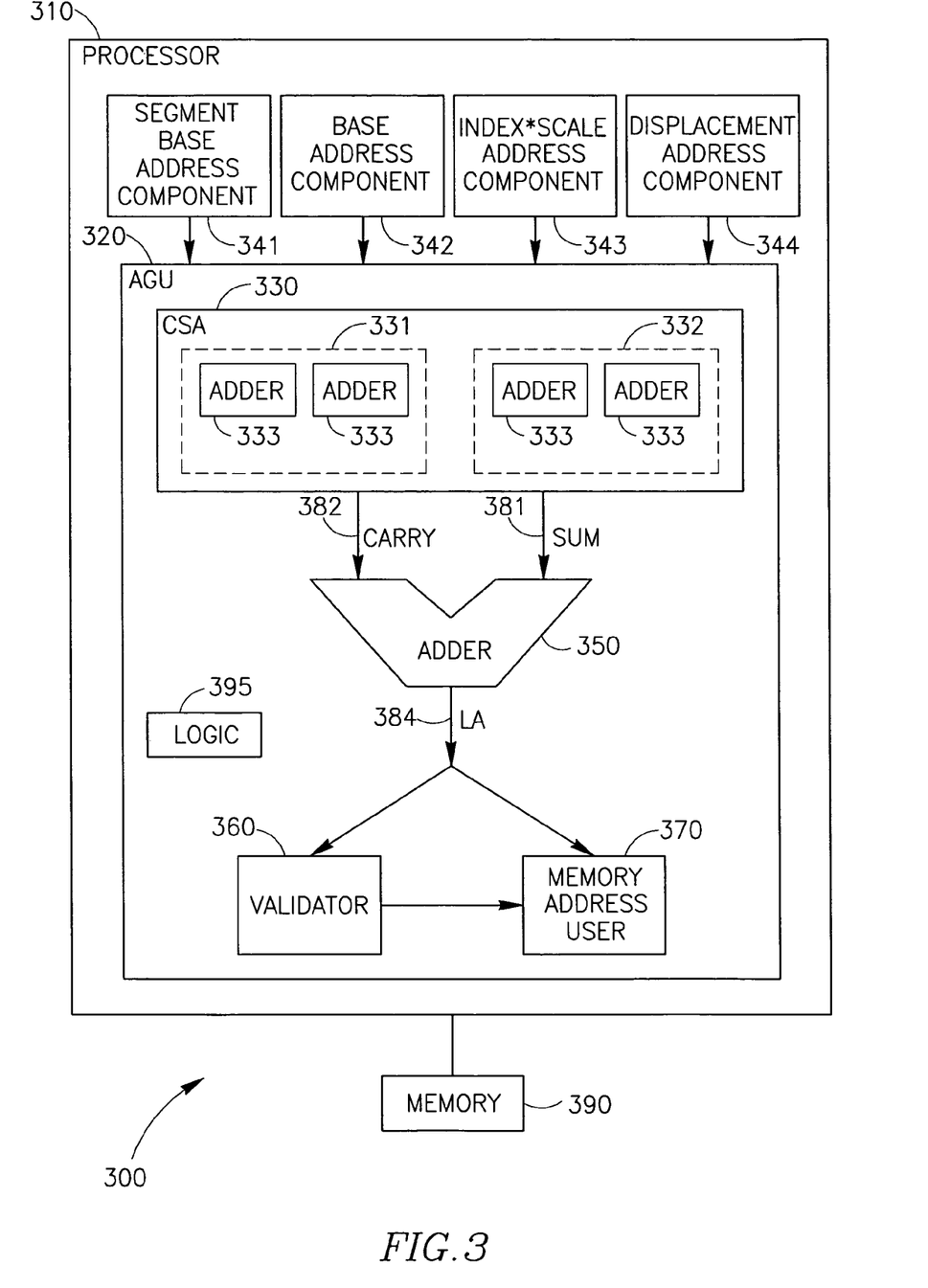
FIG. 3 is a schematic block diagram illustration of a processor able to utilize reduced-power memory address generation in accordance with an embodiment of the invention.

FIG. 3 schematically illustrates a subsystem 300 able to utilize reduced-power memory address generation in accordance with some embodiments of the invention. Subsystem 300 may be, for example, a subsystem of computing system 100 of FIG. 1, a subsystem of computing system 200 of FIG. 2, a subsystem of another computing system or computing device, or the like.

Subsystem 300 may include, for example, a memory 390 and a processor 310. Memory 390 may include, for example, a local memory, a cache memory, a RAM memory, a memory accessible through a direct connection, a memory accessible through a bus, or the like. Processor 310. may include, for example, an address generation unit (AGU) 320. The AGU 320 may include, for example, a carry save adder (CSA) 330, an adder 350, a validator 360, and a memory address user 370.

AGU 320 may receive one or more address components and may generate a linear address (LA) therefrom. In some embodiments, for example, AGU 320 may generate a 64-bit memory address. In some embodiments, for example, AGU 320 may generate a 64-bit memory address such that a first portion of the memory address (e.g., 48 bits) may be used to refer to a certain location or portion of memory 390, whereas a second portion of the memory address (e.g., 16 bits) may not be used to refer to memory 390.

In some embodiment, for example, the memory address may be represented using N bits, such that K bits out of the N bits may refer to a location or portion of memory 390, whereas the other bits (namely, the other N minus K bits) may not refer to that location or portion of memory 390.

In some embodiments, for example, a memory address generated by AGU 320 may be canonical, e.g., may be in compliance with one or more pre-defined formatting requirements, processor-specific requirements, or architecture-specific requirements. In some embodiments of the invention, AGU 320 may generate a memory address, and may check whether the generated memory address is canonical. If the generated memory address is canonical, then the memory address may be further utilized by processor 310, e.g., by memory address user 370. In contrast, if the generated memory address is not canonical (e.g., if validator 360 determines that the generated memory address is not canonical), then one or more suitable operations may be performed, for example, the memory address (or a portion thereof) may be corrected or re-generated (e.g., taking into account substantially all the bits of substantially all the address components), the memory address may be replaced with a canonical memory address, the non-canonical memory address (or a portion thereof) may be converted or modified into a canonical memory address (or a portion thereof), a canonical fault may be asserted or indicated (e.g., using a flag, a message, a signal, a warning message, a fault message, an indication, or the like), a canonical fault handler may be called or activated, or other suitable operations may be performed. In some embodiments, optionally, a software application (e.g., executed by processor 310) may include code to handle a canonical fault, for example, using a fault handler, a general protection fault (GPF) handler, an exception handler, or the like.

The CSA 330 may include, for example, multiple cells or adders 333 able to add bits or data. For example, CSA 330 may include multiple sets of adders, e.g., a first set of adders 331 and a second set of adders 332. In some embodiments, for example, CSA 330 may include 64 adders, such that the first set of adders 331 may include 48 adders, whereas the second set of adders 332 may include 16 adders.

Although portions of the discussion herein may relate, for demonstrative purposes, to CSA 330 having 64 adders, other number of adders may be used in CSA 330, for example, 32 adders, 48 adders, 64 adders, or the like.

Although portions of the discussion herein may relate, for demonstrative purposes, to a first set of adders 331 that includes 48 adders and a second set of adders 332 that includes 16 adders, other numbers of one or more adders may be used in the first set of adders 331 and/or the second set of adders 332. In some embodiments, for example, a set of adders (e.g., the first set 331 and/or the second set 332) may include consecutive adders and/or non-consecutive adders. In some embodiments, CSA 330 may include more than two sets of adders, for example, three sets, four sets, or the like.

The CSA 330 may add together multiple input operands, for example, multiple address components 341-344. Although four address components 341-344 are shown for demonstrative purposes, other numbers of address components may be used and/or may be added together by CSA 330. In accordance with some embodiments of the invention, CSA 330 may selectively add together portions of the multiple input operands, e.g., instead of adding together the complete input operands.

In some embodiments, for example, CSA 330 may add together the address components 341-344. The CSA 330 may produce two output vectors, for example, a sum vector 381 and a carry vector 382. For example, the i-th adder of CSA 330 may add the i-th bit of the input operands to produce the i-th bit of the output vectors. The adder 350, for example, a Kogge-Stone (KS) adder, may add the sum vector 381 and the carry vector 382, thereby producing a candidate LA 384.

In accordance with some embodiments of the invention, the first set of adders 331 of CSA 330 may have a first set of properties, whereas the second set of adders 332 of CSA 330 may have a second, different, set of properties. For example, the first set of adders 331 of CSA 330 may receive as input one or more data items (e.g., operands or address components) having a first size or a first number of bits (e.g., 64 bits); whereas the second set of adders 332 of CSA 330 may receive as input one or more data items (e.g., operands of address components) having a second size or a second number of bits (e.g., 48 bits). In some embodiments, for example, the first set of adders 331 and the second set of adders 332 may produce the same number of outputs, e.g., two outputs.

In some embodiments, for example, CSA 330 may include 64 adders, e.g., such that CSA 330 may be able to add together operands having a size of up to 64 bits per operand. The first set of adders 331 may receive a first number of inputs, e.g., four inputs or four input bits, and may produce a certain number of outputs, e.g., two outputs; whereas the second set of adders 332 may receive a second (e.g., reduced) number of inputs, e.g., two inputs to two input bits, and may produce, for example, the same number of outputs, e.g., two outputs. In some embodiments, for example, the first set of adders 331 may receive as input substantially all the bits (e.g., 64 bits per operand) of the four address components 341-344; whereas the second set of adders 332 may receive as input some of the bits (e.g., 48 bits per operand) of the four address components 341-344, or a reduced amount of bits smaller than the total amount of bits per operand.

In some embodiments, although the second set of adders 332 may not receive as input all the bits of the input operands, AGU 320 may utilize information about one or more portions of the input operands in order to check and/or determine whether or not the generated memory address is canonical, and in order to indicate, correct and/or otherwise handle a canonical fault which may be detected. In some embodiments, for example, AGU 320 may apply an algorithm utilizing information about the content or the expected content of one or more portions of the input operands, in order to determine whether or not the generated memory address is canonical, even though one or more portions of the input operands may not be added by CSA 330.

In some embodiments, the address components 341-344 may include, for example, a segment base component, a base component, an index*scale component, and a displacement component, e.g., respectively. For example, address component 341 may include a segment component indicating a base value of an architectural segment; for example, the value of address component 341 may be canonical, and may be represented using 48 bits. Address component 342 may include a base component indicating a reference starting point address within the segment address space; for example, address component 342 may be represented using 64 bits. Address component 343 may include, for example, an index*scale component (e.g., utilizing a scale of 1, 2, 4, 8, or the like), which may be represented using 64 bits. Address component 344 may include, for example, a displacement component, e.g., an immediate value of reference; for example, address component 344 may be sign extended, and/or may be represented using 32 bits.

In some embodiments, for example, the AGU 320 may generate a LA by adding together the four address components 341-344, e.g., utilizing the following equation:

$$LA = \text{segment base} + \text{base} + \text{index}*\text{scale} + \text{displacement} \qquad \text{Equation 1}$$

Other suitable equations may be used in accordance with embodiments of the invention.

In some embodiments, for example, the segment base (e.g., address component 341) may be canonical, e.g., all the 16 upper bits of the value of the 64-bit segment base may be "1", or all the 16 upper bits of the value of the 64-bit segment base may be "0". Similarly, in some embodiments, the displacement (e.g., address component 344) may include sign extension, such that all the 16 upper bits of the value of the 64-bit displacement may be "1", or all the 16 upper bits of the value of the 64-bit displacement may be "0". The AGU 320 may utilize this information, or other information or assumptions, for memory address generation, thereby obviating the need to utilize all 64 bits of the segment base and/or all 64 bits of the displacement for memory address generation.

In some embodiments, for example, the following statements may be defined and/or used:

$$\text{Canonical\_Or=displacement [47] OR segment\_base [47]} \quad \text{Statement 1}$$

$$\text{Canonical\_Xor=displacement [47] XOR segment\_base [47]} \quad \text{Statement 2}$$

$$\text{Canonical\_And=displacement [47] AND segment\_base [47]} \quad \text{Statement 3}$$

wherein the denotation [47] indicates the 48th bit (since bit number zero is counted as the first bit).

For example, Statement 1 may relate to a demonstrative example in which all the upper 16 bits (out of 64 bits) of the segment base have a value of zero, and all the upper 16 bits (out of 64 bits) of the displacement have a value of zero. As indicated in Statement 1, the parameter Canonical_Or may return a value of one if the 48th bit of the displacement component has a value of one, or if the 48th bit of the segment base component has a value of one, of if the 48th bit of the displacement component has a value of one and the 48th bit of the segment base component has a value of one; otherwise, the parameter Canonical_Or may return a value of zero.

Similarly, for example, Statement 3 may relate to a demonstrative example in which all the upper 16 bits (out of 64 bits) of the segment base have a value of one, and all the upper 16 bits (out of 64 bits) of the displacement have a value of one. As indicated in Statement 1, the parameter Canonical_And may return a value of one if the 48th bit of the displacement component has a value of one and the 48th bit of the segment base component has a value of one; otherwise, the parameter Canonical_And may return a value of zero.

In contrast, for example, Statement 2 may relate to a demonstrative example in which all the upper 16 bits (out of 64 bits) of the segment base have a value of zero, and all the upper 16 bits (out of 64 bits) of the displacement have a value of one, or vice versa. As indicated in Statement 2, the parameter Canonical_Xor may return a value of one if the 48th bit of the displacement component has a value of one and the 48th bit of the segment base component has a value of zero; or, if the 48th bit of the displacement component has a value of zero and the 48th bit of the segment base component has a value of one; otherwise, the parameter Canonical_Xor may return a value of zero.

In some embodiments, for example, CSA 330 may generate a candidate LA, which may be denoted LA', by adding together: the lower 48 bits (out of 64 bits) of the segment base address component, the 64 bits of the base address component, the 64 bits of the index*scale address component, and the lower 48 bits (out of 64 bits) of the displacement address component. Optionally, the lower 48 bits of the displacement address component may include, for example, lower 32 bits of displacement immediate value, which may be sign extended into 48 bits (e.g., using a sign extending vector).

Optionally, the CSA 330 may utilize a zero extending vector instead of adding the upper 16 bits of the segment base address component, and/or instead of adding the upper 16 bits of the displacement address component.

In some embodiments, for example, the following equation may be used:

$$LA' = (\text{segment\_base}[47:0] \, SX \, 64) + \text{base}[63:0] ++ \text{index*scale}[63:0] + ((\text{displacement}[31:0] \, SX \, 48) ZX \, 64) \quad \text{Equation 2}$$

wherein SX 64 indicates a 64-bit sign extending vector; ZX 64 indicates a 64-bit zero extending vector; the denotation [63:0] indicates the 64 bits that begin with the least significant bit (LSB) (e.g., bit number zero, which is the first bit) and end with the most significant bit (MSB) (e.g., the 63rd bit); and the denotation [47:0] indicates the 48 bits that begin with the LSB (e.g., bit number zero, which is the first bit) and end with the 48th bit.

In some embodiments, the following pseudo-code may be used to check whether or not a generated memory address is canonical:

Code 1

```
IF ((( LA'[63:47] = '0::17) OR (LA'[63:47] = '1::17)) AND
NOT Canonical_Or)
    THEN canonical_fault := '0
ELSE IF ((( LA'[63:47] = '0::15 & '10) OR (LA'[63:47] = '0::16 & '1))
AND Canonical_Xor)
    THEN canonical_fault := '0
ELSE IF (((LA'[63:47]= '0::15 & '11) OR (LA'[63:47]= '0::14 & '100))
AND Canonical_And)
    THEN canonical_fault := '0
ELSE canonical_fault := '1
```

In Code 1, the denotation LA' denotes the candidate LA generated; the denotation LA'[63:47] indicates the upper 17 bits (out of 64 bits) of LA'; the denotation '0::17 indicates a sequence of 17 zero bits; the denotation '0::16 indicates a sequence of 16 zero bits; the denotation '0::15 indicates a sequence of 15 zero bits; the denotation '0::14 indicates a sequence of 16 zero bits; the denotation '1::17 indicates a sequence of 17 one bits; the denotation '10 indicates a sequence of one and zero; the denotation of '11 indicates a sequence of one and one; the denotation '100 indicates a sequence of one, zero and zero; and the parameter canonical_fault indicates whether or not a canonical fault is detected, wherein a value of 1 indicates that a canonical_fault is detected (e.g., the generated memory address LA' is non canonical), and a value of 0 indicates that a canonical fault is not detected (e.g., the generated memory address LA' is canonical).

For example, the first IF statement in Code 1 may check whether all the upper 17 bits of LA' have a value of zero, or whether all the upper 17 bits of LA' have a value of one. If this condition holds true, and a Canonical_Or statement (Statement 1) does not hold true, then it may be determined that LA' is canonical. In some embodiments, the first IF statement in Code 1 may correspond to Statement 1 discussed above.

In some embodiments, for example, the first IF statement in Code 1 may handle a demonstrative example in which all the upper 16 bits of the displacement address component have a value of zero, and all the upper 16 bits of the segment base address component have a value of zero. Accordingly, the sum of the upper 16 bits of the displacement address component and the upper 16 bits of the segment base address component includes 16 values of zero. If, in addition, the 48th bit of the displacement address component (denoted displacement [47] in Statement 1) has a value of zero, and the 48th bit of the segment base address component (denoted segment_base [47] in Statement 1) has a value of zero, then the Canonical_Or parameter returns a value of one. Since all the upper 17 bits of the displacement address component have a value of zero, and all the upper 17 bits of the segment base address component have a value of zero, the first IF statement in Code 1 assigns a value of zero to the Canonical_Fault parameter, since the upper 16 bits of the displacement address component and the upper 16 bits of the segment base address component do not affect the calculation of the LA and need not be added by CSA 330.

Similarly, the second IF statement in Code 1 may check whether the upper 17 bits of LA' include a sequence of 15 zero values followed by a one value and a zero value; or whether the upper 17 bits of LA' include a sequence of 16 zero values followed by a one value. If this condition holds true, and a Canonical_Xor statement (Statement 2) holds true, then it may be determined that LA' is canonical. In some embodiments, the second IF statement in Code 1 may correspond to Statement 2 discussed above.

Similarly, the third IF statement in Code 1 may check whether the upper 17 bits of LA' include a sequence of 15 one values followed by two one values; or whether the upper 17 bits of LA' include a sequence of 14 zero values followed by a one value and two zero values. If this condition holds true, and a Canonical_And statement (Statement 3) holds true, then it may be determined that LA' is canonical. In some embodiments, the third IF statement in Code 1 may correspond to Statement 3 discussed above.

In contrast, if none of the conditions checked by the three IF statements of Code 1 holds true, then it may be determined that LA' is non-canonical.

In some embodiments, the following demonstrative tables may be used:

TABLE 1

| | 63 | 62 | 61 | 60 | 59 | 58 | 57 | 56 | 55 | 54 | 53 | 52 | 51 | 50 | 49 | 48 | 47 |
|---|---|---|---|---|---|---|---|---|---|---|---|---|---|---|---|---|---|
| LA' | 0 | 0 | 0 | 0 | 0 | 0 | 0 | 0 | 0 | 0 | 0 | 0 | 0 | 0 | 0 | 1 | 0 |
| segment_base + displacement | 1 | 1 | 1 | 1 | 1 | 1 | 1 | 1 | 1 | 1 | 1 | 1 | 1 | 1 | 1 | 1 | |
| LA | 0 | 0 | 0 | 0 | 0 | 0 | 0 | 0 | 0 | 0 | 0 | 0 | 0 | 0 | 0 | 0 | 0 |

TABLE 2

| | 63 | 62 | 61 | 60 | 59 | 58 | 57 | 56 | 55 | 54 | 53 | 52 | 51 | 50 | 49 | 48 | 47 |
|---|---|---|---|---|---|---|---|---|---|---|---|---|---|---|---|---|---|
| LA' | 0 | 0 | 0 | 0 | 0 | 0 | 0 | 0 | 0 | 0 | 0 | 0 | 0 | 0 | 0 | 0 | 1 |
| segment_base + displacement | 1 | 1 | 1 | 1 | 1 | 1 | 1 | 1 | 1 | 1 | 1 | 1 | 1 | 1 | 1 | 1 | |
| LA | 1 | 1 | 1 | 1 | 1 | 1 | 1 | 1 | 1 | 1 | 1 | 1 | 1 | 1 | 1 | 1 | 1 |

TABLE 3

| | 63 | 62 | 61 | 60 | 59 | 58 | 57 | 56 | 55 | 54 | 53 | 52 | 51 | 50 | 49 | 48 | 47 |
|---|---|---|---|---|---|---|---|---|---|---|---|---|---|---|---|---|---|
| LA' | 0 | 0 | 0 | 0 | 0 | 0 | 0 | 0 | 0 | 0 | 0 | 0 | 0 | 1 | 0 | 0 | |
| segment_base + displacement | 1 | 1 | 1 | 1 | 1 | 1 | 1 | 1 | 1 | 1 | 1 | 1 | 1 | 1 | 0 | | |
| LA | 0 | 0 | 0 | 0 | 0 | 0 | 0 | 0 | 0 | 0 | 0 | 0 | 0 | 0 | 0 | 0 | 0 |

TABLE 4

| | 63 | 62 | 61 | 60 | 59 | 58 | 57 | 56 | 55 | 54 | 53 | 52 | 51 | 50 | 49 | 48 | 47 |
|---|---|---|---|---|---|---|---|---|---|---|---|---|---|---|---|---|---|
| LA' | 0 | 0 | 0 | 0 | 0 | 0 | 0 | 0 | 0 | 0 | 0 | 0 | 0 | 0 | 1 | 1 | |
| segment_base + displacement | 1 | 1 | 1 | 1 | 1 | 1 | 1 | 1 | 1 | 1 | 1 | 1 | 1 | 1 | 0 | | |
| LA | 1 | 1 | 1 | 1 | 1 | 1 | 1 | 1 | 1 | 1 | 1 | 1 | 1 | 1 | 1 | 1 | |

In Tables 1-4, the first row is divided into 17 columns numbered 47 through 63, corresponding to the 48th through 64th bit. The second row indicates the values of the upper 17 bits of the LA' as generated by the AGU 320 by adding together: the lower 48 bits (out of 64 bits) of the segment base address component, the 64 bits of the base address component, the 64 bits of the index*scale address component, and the lower 48 bits (out of 64 bits) of the displacement address component. The fourth row indicates the values of the upper 17 bits of the LA that may be as calculated by adding together: the 64 bits of the segment base address component, the 64 bits of the base address component, the 64 bits of the index*scale address component, and the 64 bits of the displacement address component. The third row indicates the sum of: the 16 upper bits of the segment base component, and the 16 upper bits of the displacement component.

In some embodiments, Tables 1-4 or other suitable tables may be used, for example, to determine that the LA' generated by AGU 320 appears to be canonical whereas a correct LA, calculated by adding together all the 64 bits of the four address components, is non-canonical; or vice versa, namely, to determine that the LA' generated by AGU 320 appears to be non-canonical whereas a correct LA, calculated by adding together all the 64 bits of the four address components, is canonical.

For example, Tables 1 and 2 may correspond to the second IF statement of Code 1. As shown in Table 1, the upper bits of LA' include a sequence of 15 values of zero, followed by a value of one and a value of zero; this structure corresponds to the first comparison of the second IF statement of Code 1. Similarly, as shown in Table 2, the upper bits of LA' include a sequence of 16 values of zero, followed by a value of one; this structure corresponds to the second comparison of the second IF statement of Code 1.

Similarly, Tables 3 and 4 may correspond to the third IF statement of Code 1. As shown in Table 3, the upper bits of LA' include a sequence of 14 values of zero, followed by a value of one and two values of zero; this structure corresponds to the second comparison of the third IF statement of Code 1. Similarly, as shown in Table 4, the upper bits of LA' include a sequence of 15 values of zero, followed by two values of one; this structure corresponds to the first comparison of the third IF statement of Code 1.

In some embodiments, for example, CSA 330 and/or AGU 320 may include other suitable components, or may operate by applying other suitable algorithms or calculations. For example, in some embodiments, CSA 330 may include N cells or adders, and may receive M operands (e.g., address components) having N bits per operand. A first cell or adder, for example, the i-th cell or adder of the CSA 330, may receive input from all the M operands, e.g., may receive the i-th bits of the M operands as inputs, and may produce (e.g., by adding the inputs together) the i-th bit of an output. A second cell or adder, for example, the j-th cell or adder of the CSA 330, may receive input from only some of the M operands (but not all of them), e.g., from K operands out of the M operands; for example, the j-th cell or adder may receive the j-th bits of only K operands, and may produce (e.g., by adding the inputs together) the j-th bit of an output. Accordingly, an output may be produced such that a first bit (the i-th bit) of the output is calculated based on adding together N bits (corresponding to N operands), whereas the j-th bit of the output is calculated based on adding together only K bits (corresponding to K operands of the total N operands).

In some embodiments, one or more of the operands (e.g., the address components) may be extended, for example, using sign-extension and/or zero-extension. In some embodiments, for example, an operand may be sign-extended from K bits to N bits, e.g., by appending to the operand a sequence of one or more copies of the sign bit, for example, a sequence repeating N minus K times the sign bit of the operand. In some embodiments, for example, an operand may be zero-extended from K bits to N bits, e.g., by appending to the operand a sequence of one or more zero values, for example, a sequence repeating N minus K times a zero value. In some embodiments, it may be determined to zero-extend an operand (e.g., an address component) instead of to sign-extend the operand, even if the zero-extend may modify the value of the operand (e.g., if the unmodified operand is negative); the determination may be performed, for example, if it is expected that the extended portion of the operand may not affect whether or not the generated memory address is canonical.

Some embodiments may allow, for example, a decrease in hardware components and/or a decrease in power consumption. For example, instead of using a 64-bit reducer CSA to add four 64-bit operands of address components (e.g., by reducing the four 64-bit operands into two 64-bit sum/carry vectors, and then adding the two 64-bit carry/sum vectors using a KS adder), some embodiments of the invention may utilize a reduced-power circuit and/or reduced-hardware circuit. For example, a 48-bit CSA having four inputs and two outputs may be used to add the lower 48 bits of the four operands of address components; and a secondary (e.g., "degenerate") adder, e.g., a 16-bit CSA having two inputs and two outputs, may be used to add the upper 16 bits of only two out of the four operands of address components (namely, to add the upper 16 bits of the base component and the upper 16 bits of the index*scale component). In one embodiment, for example, power leakage calculations may indicate a possible power saving of approximately 23 percent.

In some embodiments, optionally, AGU 320 may include a logic unit 395, for example, to perform one or more calculations related to the operation of AGU 320, or to perform one or more calculations or operations as described herein. In one embodiment, for example, logic unit 395 may be implemented using a separate sub-unit or sub-circuit of AGU 320. In other embodiments, for example, logic unit 395 may be implemented as part of CSA 330, as part of adder 350, as part of validator 360, as part of memory address user 370, or the like. In some embodiments, for example, logic unit 395 may determine whether or not to utilize CSA 330 for memory address generation, whether or not to correct or re-generate a candidate memory address, or the like.

In some embodiments, memory address user 370 may include, for example, a memory cluster, an address bus, a register, a register file, an address register, a sub-unit of AGU 320, a unit external to AGU 320, a unit internal to AGU 320, a sub-unit of processor 310, a software component (e.g., a code or a portion thereof) which may utilize the generated memory address, a data translation lookaside buffer (DTLB), or the like.

In some embodiments, validator 360 may perform one or more operations related to validation of the generated LA, for example, operations to determine whether the generated LA is canonical or non-canonical, operations to check whether the generated LA is in accordance with one or more formats or architecture requirements, operations to produce a signal or a message indicating a property of the generated LA (e.g., an indication that the generated LA is canonical, an indication that the generated LA is non-canonical, a canonical fault indication, a general protection fault (GPF) indication, or the like), or other suitable operations. In some embodiments, optionally, validator 360 may produce output (e.g., a canonical property indication, a non-canonical property indication, a non-canonical fault indication, or the like) which may be transferred to one or more other units, e.g., to a sub-unit of AGU 320 or processor 310, to memory address user 370, or the like.

Figure 4:
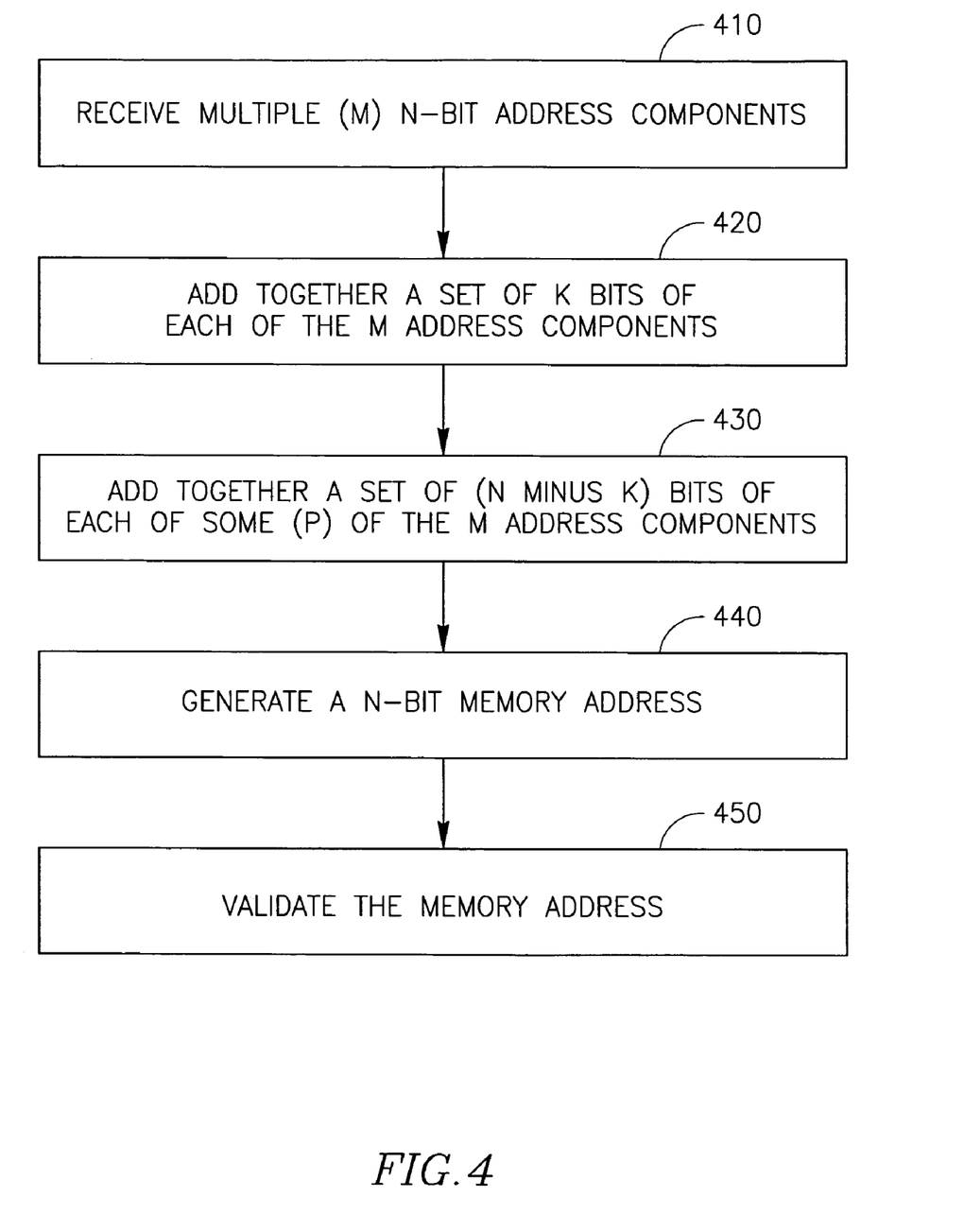
FIG. 4 is a schematic flow-chart of a method of reduced-power memory address generation in accordance with an embodiment of the invention.

FIG. 4 is a schematic flow-chart of a method of reduced-power memory address generation in accordance with some embodiments of the invention. Operations of the method may be implemented, for example, by subsystem 300 of FIG. 3, and/or by other suitable computers, processors, components, devices, and/or systems.

As indicated at block 410, the method may optionally include, for example, receiving multiple N-bit address components, e.g., four 64-bit address components. The number of N-bit address components received may be denoted as M. In a demonstrative embodiment of the invention utilizing four 64-bit address components, for example, N may be equal to 64, and M may be equal to 4.

As indicated at block 420, the method may optionally include, for example, adding together a set of K bits of each of the M address components to produce a first output of K bits, wherein K is smaller than N. This may include, for example, adding together the lower 48 bits (e.g., K may be equal to 48) of each of the four address components, to produce a 48-bit result. For example, the i-th bit of all the M address components may be added together, to produce the i-th bit of the result.

As indicated at block 430, the method may optionally include, for example, adding together a set of N minus K bits of each of P address components out of the M address components; i.e., adding together a set of N minus K bits of a number of the address components (P) smaller than the total number of address components (M), to produce a second output of N minus K bits. In a demonstrative embodiment, for example, M may be equal to 4, and P may be equal to 2. This may include, for example, adding together the upper 16 bits (e.g., N minus K may be equal to 16) of each of two address components (out of the four address components), to produce a 16-bit result. For example, the j-th bit of each of the P address components may be added together, to produce the j-th bit of the result.

In some embodiments, the operations of blocks 420 and 430 may be performed in serial, in parallel, substantially simultaneously, or the like.

In some embodiments, optionally, for example, it may be determined to perform the operations of block 420 and/or block 430 based on information, e.g., information that the N minus K bits are in accordance with a canonical format, information that the N minus K have an equal value or a constant value, information that the N minus K bits include a certain sequence of values (e.g., a sequence of zero values, a sequence of one values, or the like), or other information about the N bits, the K bits, or the N minus K bits.

As indicated at block 440, the method may optionally include, for example, generating a N-bit memory address, e.g., based on the first output of K bits and the second output of N minus K bits. For example, a 64-bit memory address may be generated based on the 48-bit output of block 420 and the 16-bit output of block 430.

As indicated at block 450, the method may optionally include, for example, validating the generated memory address. This may include, for example, checking whether the generated memory address (or a portion thereof) is in accordance with a canonical format. In some embodiments, for example, this may include checking whether the N minus K bits of the address components that were not added may affect whether the generated memory address is in accordance with a canonical format. In some embodiments, for example, if it is determined that the N minus K bits of the address components that were not added may affect whether the generated memory address is in accordance with a canonical format, then one or more suitable operations may be performed, for example, a signal or indication may be sent, a canonical fault signal or flag may be asserted, a canonical fault may be determined and/or handled, the generated memory address may be discarded or corrected or re-generated (e.g., using substantially all the bits of all the address components, or using other portions of the address components), or the like.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by processor 310, by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 135 or 202), memory device, memory article, memory medium, storage device, storage article, storage medium and/or storage unit, for example, memory, removable or non-removable media, erasable or non-erasable media, writeable or re-writeable media, digital or analog media, hard disk, floppy disk, compact disk read only memory (CD-ROM), compact disk recordable (CD-R), compact disk re-writeable (CD-RW), optical disk, magnetic media, various types of digital versatile disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for generating a linear address comprising:
   receiving a plurality (M) of N-bit address components, a first group of said N-bit address components comprising two address components in a format conforming to canonical address format and a second group comprising the other M-2 address components;

adding together the lower K bits of each of said M address components to produce the lower K bits of said linear address, wherein K is smaller than N; and adding together the upper N minus K bits of said second group of address components to produce the upper N minus K bits of said linear address, wherein in an address having canonical format each of the upper N-K bits of the address equals the K-th bit of said address.

2. The method of claim 1, further comprising:

checking whether said linear address is in accordance with a canonical format.

3. The method of claim 2, comprising:

checking whether said linear address is canonical, based on the values of the upper N minus K plus 1 bits of said linear address and the K-th bit of each of said two canonical address components.

4. The method of claim 3, wherein M equals 4 and wherein said linear address is canonical when:

$$(((LA'[(N-1):(K-1)]='0::N-K+1)OR(LA'[(N-1):(K-1)]='1::N-K+1))AND\ NOT\ Canonical\_Or),$$

when:

$$(((LA'[(N-1):(K-1)]='0::N-K-1\ \&\ '10)OR(LA'[(N-1):(K-1)]='0::N-K\ \&\ '1))AND\ Canonical\_Xor),$$

and when $$(((LA'[(N-1):(K-1)]='0::N-K-1\ \&\ '11)OR(LA'[(N-1):(K-1)]'0::N-K-2\ \&\ '100))AND\ Canonical\_And),$$

wherein

Canonical_Or=the K-th bit of the first canonical address component OR the K-th bit of the second canonical address component, Canonical_Xor=the K-th bit of the first canonical address component XOR the K-th bit of the second canonical address component, Canonical_And=the K-th bit of the first canonical address component AND the K-th bit of the second canonical address component, and wherein OR denotes logical OR, AND denotes logical AND, NOT denotes logical NOT, XOR denotes logical XOR, LA' denotes said linear address.

5. The method of claim 2, further comprising producing a signal indicating a canonical fault when said linear address is not in accordance with a canonical format.

6. The method of claim 1, wherein M=4, N=64 and k=48.

7. The method of claim 1, wherein said canonical address components are segment base address component and displacement address component, and said second group of said M-2 address components comprises base address component and index*scale address component.

8. An apparatus comprising:

an adder to receive a plurality (M) of N-bit address components, a first group of said N-bit address components comprising address components in a format conforming to canonical address format and a second group comprising the other M-2 address components, said adder to produce a N-bit linear address, said adder comprising:

a first set of adders to receive the lower K bits of each of said M address components, to add together said lower K bits and to produce the lower K bits of said linear address, wherein K is smaller than N; and a second set of adders to receive the upper N minus K bits of said second group of address components, to add together said upper N minus K bits and to produce the upper N minus K bits of said linear address, wherein in an address having canonical format each of the upper N-K bits of the address equals the K-th bit of said address.

9. The apparatus of claim 8, further comprising:

a validator to check whether said linear address is in accordance with a canonical format.

10. The apparatus of claim 9, wherein said validator to produce a signal indicating a canonical fault when said linear address is not in accordance with a canonical format.

11. The apparatus of claim 9, wherein said validator is to check whether said linear address is canonical, based on the values of the upper N minus K plus 1 bits of said linear address and the K-th bit of each of said two canonical address components.

12. The apparatus of claim 9, wherein M equals 4 and wherein said validator to determine that said linear address is canonical when:

$$(((LA'[(N-1):(K-1)]='0::N-K+1)OR(LA'[(N-1):(K-1)]='1::N-K+1))AND\ NOT\ Canonical\_Or),$$

when:

$$(((LA'[(N-1):(K-1)]='0::N-K-1\ \&\ '10)OR(LA'[(N-1):(K-1)]='0::N-K\ \&\ '1))AND\ Canonical\_Xor),$$

and when $$(((LA'[(N-1):(K-1)]='0::N-K-1\ \&\ '11)OR(LA'[(N-1):(K-1)]'0::N-K-2\ \&\ '100))AND\ Canonical\_And),$$

wherein

Canonical_Or=the K-th bit of the first canonical address component OR the K-th bit of the second canonical address component, Canonical_Xor=the K-th bit of the first canonical address component XOR the K-th bit of the second canonical address component, Canonical_And=the K-th bit of the first canonical address component AND the K-th bit of the second canonical address component, and wherein OR denotes logical OR, AND denotes logical AND, NOT denotes logical NOT, XOR denotes logical XOR, LA' denotes said linear address.

13. The apparatus of claim 8, wherein M=4, N=64 and k=48.

14. The apparatus of claim 8, wherein said canonical address components are segment base address components and displacement address components, and said second group of said M-2 address components comprises base address component and index*scale address component.

15. A system comprising:

a dynamic random access memory to store data; and an address generation unit to receive a plurality (M) of N-bit address components, a first group of said N-bit address components comprising two address components in a format conforming to canonical address format and a second group comprising the other M-2 address components, said address generation unit further to produce a N-bit linear address, the address generation unit comprising:

a first cell to receive the lower K bits of each of said M address components, to add together said lower bits and to produce the lower K bits of said linear address, wherein K is smaller than N; and a second cell to receive the upper N minus K bits of said second group of address components, to add together said upper N minus K bits and to produce the upper N minus K bits of said linear address, wherein in an address having canonical format each of the upper N-K bits of the address equals the K-th bit of said address.

16. The system of claim 15, further comprising a processor to access said address of said memory based on said linear address.

17. The system of claim 15, comprising a validator to check whether said linear address is in accordance with a canonical format.

18. The system of claim 17, wherein said validator is to check whether said linear address is canonical, based on the values of the upper N minus K plus 1 bits of said linear address and the K-th bit of each of said two canonical address components.

19. The system of claim 18, wherein M equals 4 and wherein said validator is to determine that said linear address is canonical when:

$$(((LA'[(N-1):(K-1)]='0::N-K+1)\text{OR}(LA'[(N-1):(K-1)]='1::N-K+1))\text{AND NOT Canonical\_Or}),$$

when:

$$(((LA'[(N-1):(K-1)]='0::N-K-1 \ \& \ '10)\text{OR}(LA'[(N-1):(K-1)]'0::N-K \ \& \ '1))\text{AND Canonical\_Xor}),$$

and when $$(((LA'[(N-1):(K-1)]='0::N-K-1 \ \& \ '11)\text{OR}(LA'[(N-1):(K-1)]='0::N-K-2 \ \& \ '100))\text{AND Canonical\_And}),$$

wherein

Canonical_Or=the K-th bit of the first canonical address component OR the K-th bit of the second canonical address component, Canonical_Xor=the K-th bit of the first canonical address component XOR the K-th bit of the second canonical address component, Canonical_And=the K-th bit of the first canonical address component AND the K-th bit of the second canonical address component, and wherein OR denotes logical OR, AND denotes logical AND, NOT denotes logical NOT, XOR denotes logical XOR, LA' denotes said linear address.

20. The system of claim 17, wherein said validator is to produce a signal indicating a canonical fault when said linear address is not in accordance with a canonical format.

21. The system of claim 15, wherein M=4, N=64 and k=48.

22. The system of claim 15, wherein said canonical address components are segment base address component and displacement address component, and said second group of said M-2 address components comprise base address component and index*scale address component.

* * * * *

UNITED STATES PATENT AND TRADEMARK OFFICE
CERTIFICATE OF CORRECTION

PATENT NO. : 7,634,636 B2 Page 1 of 1
APPLICATION NO. : 11/472538
DATED : December 15, 2009
INVENTOR(S) : Frank et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Twenty-first Day of December, 2010

David J. Kappos
*Director of the United States Patent and Trademark Office*